(12) United States Patent
Cole

(10) Patent No.: US 6,334,561 B1
(45) Date of Patent: Jan. 1, 2002

(54) VEHICLE LOAD CARRIER AND CLAMPING MECHANISM

(75) Inventor: Stephen J. Cole, Arcata, CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/585,721

(22) Filed: May 31, 2000

(51) Int. Cl.[7] .............................. B60R 9/00; B60R 11/00
(52) U.S. Cl. ...................... 224/521; 224/519; 224/924; 403/21; 403/378; 280/506
(58) Field of Search ............................... 224/519, 520, 224/521, 924; 280/506; 403/21, 22, 378, 379.3, 379.2

(56) References Cited

U.S. PATENT DOCUMENTS

| | | | |
|---|---|---|---|
| 3,222,095 A | * 12/1965 | Gerus | |
| 3,855,946 A | * 12/1974 | Bales | |
| 4,080,080 A | * 3/1978 | Cisler | |
| 4,190,377 A | * 2/1980 | Pleuss | |
| 4,389,135 A | * 6/1983 | Peters | |
| 5,154,385 A | 10/1992 | Linberg et al. | 248/225.1 |
| 5,244,133 A | 9/1993 | Abbott et al. | 224/521 X |
| 5,449,101 A | * 9/1995 | Van Dusen | 224/506 |
| 5,547,116 A | 8/1996 | Eckhart | 224/509 |
| 5,593,172 A | 1/1997 | Breslin | 280/506 |
| 5,615,904 A | 4/1997 | Van Dusen et al. | 280/506 |
| 5,735,539 A | 4/1998 | Kravitz | 280/506 |
| D401,195 S | * 11/1998 | Chimenti | |
| 5,850,959 A | 12/1998 | Miller | 224/535 |
| 5,931,362 A | * 8/1999 | Chimenti | |
| 6,000,594 A | * 12/1999 | Chimenti | |
| 6,186,531 B1 | 2/2001 | Parent | 280/506 |

FOREIGN PATENT DOCUMENTS

| | | |
|---|---|---|
| EP | 0 016 738 B1 | 10/1980 |
| EP | 0 079 318 B1 | 5/1983 |

* cited by examiner

*Primary Examiner*—Stephen K. Cronin
(74) *Attorney, Agent, or Firm*—Kolisch Hartwell Dickinson McCormack & Heuser

(57) ABSTRACT

A vehicle load carrier including a recreational equipment rack adapted for exterior engagement on a vehicle. The recreational equipment rack includes a torque-operated clamping mechanism, including a rotatable clamp member, where the torque-operated clamping mechanism is adapted to selectively secure and release an article to the rack upon rotation of the clamp member. Also provided is a torque-applying member that is selectively configurable in an engaged configuration in which the torque-applying member and clamp member rotate together, and in a disengaged configuration in which the torque-applying member and clamp member rotate independently of one another. The torque-applying member is semi-permanently attached to, or otherwise integrated with the clamping mechanism so that it cannot be removed without disassembling the clamping mechanism.

32 Claims, 3 Drawing Sheets

ND CLAMPING
VEHICLE LOAD CARRIER AND CLAMPING MECHANISM

FIELD OF THE INVENTION

The present invention relates generally to vehicle load carriers including recreational equipment racks adapted for exterior engagement on a vehicle. More particularly, the invention relates to a fastening or clamping mechanism for use with a vehicle load carrier that may include an integrated torque-applying tool.

BACKGROUND OF THE INVENTION

Vehicle load carriers having recreational equipment racks adapted for engagement on the exterior of a vehicle are widely known. These racks typically include a number of component parts, with various fastening mechanisms being provided to secure the component parts together, or to secure various articles to the rack. The existing fastening mechanisms suffer from various problems. Some are difficult to operate, others require numerous parts and are thus costly to manufacture, while still others don't tightly secure the fastened structures together.

One type of recreational equipment rack is hitch-mountable, and includes a fastening mechanism particularly adapted to secure the rack to a hitch receiver provided on the rear bumper region of a vehicle. These racks include a hitch attachment member configured to be inserted into the hitch receiver, with the hitch attachment member being secured to the hitch receiver using a conventional locking post and cotter pin arrangement. Specifically, an elongate post is inserted transversely through holes provided in the hitch attachment member and hitch receiver that are aligned when the attachment member is inserted into the receiver. When the locking post is thus inserted, it prevents the hitch attachment member from pulling out of the hitch receiver. The locking post includes a first end that is oversized or shaped to prevent it from passing through the aligned holes, while the other end of the post includes a transverse hole configured to permit insertion of the cotter pin.

The described cotter pin arrangement is effective under limited circumstances, however it provides no mechanism to easily and tightly secure a hitch attachment member within a hitch receiver. The conventional design thus allows play, shifting and other relative movements to occur between the hitch attachment member and hitch receiver. These relative movements can, in turn, lead to squeaking, rattling or other to undesirable noises. Also, relative movements occurring between the components can result in accelerated wear to the hitch receiver and hitch attachment member.

DETAILED DESCRIPTION OF THE INVENTION

Figure 1:
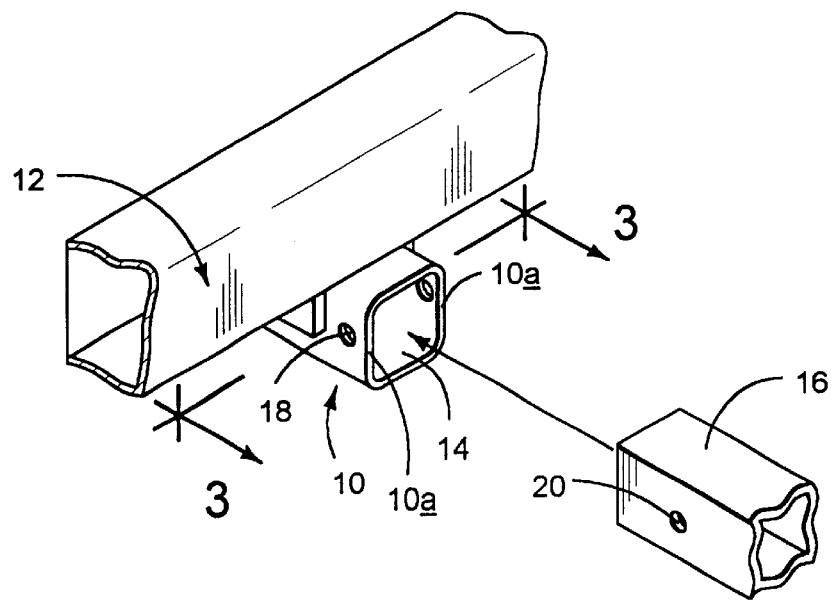
FIG. 1 is an isometric view of the rear bumper region of a vehicle, showing a hitch receiver and a hitch attachment member that may be inserted into and secured within the hitch receiver.

FIG. 1 depicts a hitch receiver 10 with which a fastening mechanism constructed according to the present invention may be used. Typically, hitch receiver 10 is formed as a tube-like structure having an open end, and is mounted to the rear bumper region 12 of a vehicle to provide an open-ended socket for receiving an inserted structure. The structure inserted into and secured within the hitch receiver may be referred to as a hitch attachment member. FIG. 1 depicts a hitch attachment member 16, with the dashed line indicating how it is inserted into hitch receiver 10. Hitch attachment member 16 may be secured to, or formed integrally with a wide variety of objects to provide a means for securing the object to a vehicle. For example, the hitch attachment member may be secured to a hitch ball assembly, a cargo carrier for carrying luggage and other loads, or to a rack configured to carry recreational equipment such as a bicycle, snowboard, skis, etc. Typically, the hitch attachment member has a cross-section that corresponds in shape and is slightly smaller than opening 14 of the hitch receiver. This permits the hitch attachment member to be inserted into the hitch receiver, while minimizing play and other relative movements occurring between the hitch attachment member and hitch receiver. The depicted hitch attachment member is tubular, though the attachment member may be solid or formed to have other desired configurations.

Hitch receiver 10 and hitch attachment member 16 are provided with holes 18 and 20 to permit transverse insertion of a pin, locking post, or other device for preventing the hitch attachment member from being removed from the hitch receiver. As shown, holes 18 are typically provided through opposed sidewalls 10a of the hitch receiver, and hole 20 is provided through the hitch attachment member so that all of the holes align when the hitch attachment member is inserted into the hitch receiver.

Figure 2:
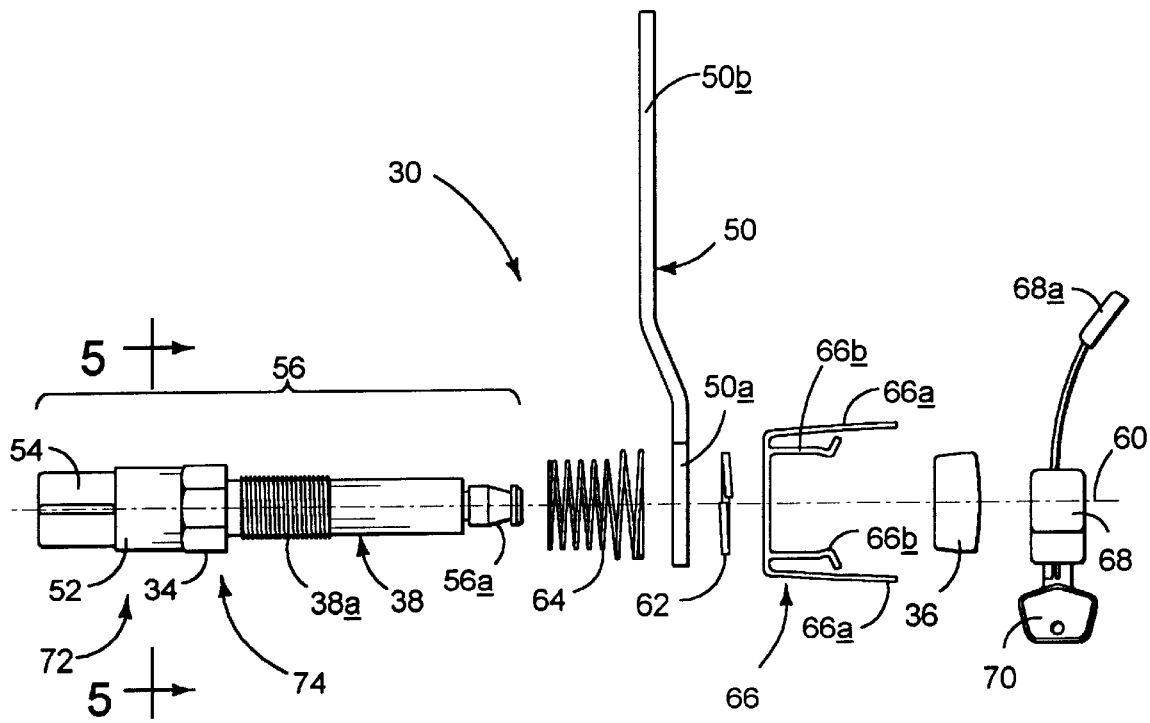
FIG. 2 is an exploded view of an embodiment of a fastening mechanism constructed according to the present invention.
Figure 3:
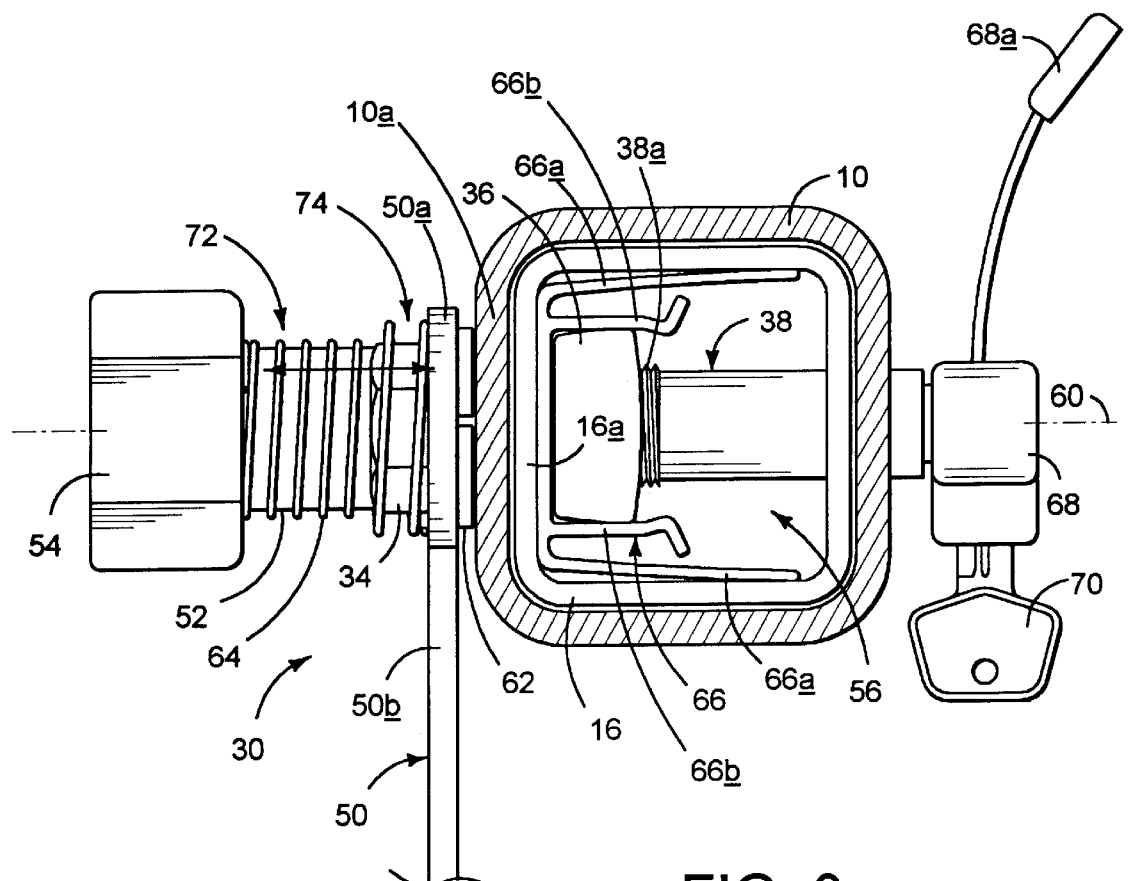
FIG. 3 is a cross-sectional end view taken along line 3—3 of FIG. 1, depicting a hitch attachment member secured within a hitch receiver using the fastening mechanism shown in FIG. 2.

FIG. 2 depicts a fastening mechanism 30 constructed according to the present invention; FIG. 3 shows the fastening mechanism as used to secure hitch attachment member 16 within hitch receiver 10. Fastening mechanism 30 takes the form of a torque-actuated clamping mechanism including a rotatable clamp member, with the clamping mechanism being configured to secure and release the hitch receiver to the hitch attachment member upon rotation of the clamp member. For example, as seen in FIG. 3, sidewall regions 10a and 16a of the hitch receiver and hitch attachment member are held between bolt head 34 and nut 36. Selective rotation of the bolt head relative to the nut causes the sidewall regions to be tightly clamped together and released, as desired.

Fastening mechanism 30 further includes a torque-applying tool or member, such as wrench 50, configured to enable a user to selectively apply torque to operate the fastening mechanism. As will be later explained in more detail, the torque-applying tool is selectively configurable in an engaged configuration in which the torque-applying member and clamp member rotate together, and in a disengaged configuration in which the torque-applying member and clamp member rotate independently of one another. Further, the torque-applying tool is semi-permanently attached or otherwise integrated with the fastening mechanism, so that the tool cannot be removed without disassembling the fastening mechanism.

Referring more particularly to FIGS. 2 and 3, fastening mechanism 30 includes an elongate bolt structure or locking post 56. Locking post 56 includes a head portion and a smaller diameter post portion 38 fixed to and extending from the head portion. The head portion includes a bolt head 34, a smooth cylindrical portion 52 adjacent the bolt head, and a manual adjustment knob 54 provided at one end of locking post 56. Locking post 56 is dimensioned so that it may be extended transversely through holes 18 and 20 provided on the hitch receiver and hitch attachment member to prevent the hitch attachment member from being pulled out of the hitch receiver.

Smaller diameter post portion 38 includes threads 38a that may be engaged with nut 36, which is positioned within the interior region of hitch attachment member 16. Bolt head 34 and nut 36 may then be rotated relative to one another about axis 60 to tighten or loosen the fastening system as desired. Knob 54 enables a user to manually rotate the locking post, and thus bolt head 34, about axis 60 relative to nut 36. As an alternative to the depicted nut, any other threaded structure or portion may be provided to engage threaded portion 38a. For example, instead of a separate threaded structure such as nut 36, the hitch attachment member may itself be provided with threads for receiving and engaging threaded portion 38a.

Fastening mechanism 30 may further include a lock washer 62 and a nut retainer 66. Lock washer 62 and a portion of nut retainer 66 are positioned between bolt head 34 and nut 36 on opposing sides of secured regions 10a and 16a of the hitch receiver and hitch attachment member. Nut retainer 66 is configured to hold nut 36 fixed against rotation relative to hitch attachment member 16 and includes two outwardly-biased arms 66a and a pair of retaining arms 66b configured to hold the nut. Arms 66a contact and press against the interior walls of hitch attachment member 16 to maintain the retainer and nut in place. Alternatively, the nut may be dimensioned so that it directly engages the interior walls of the hitch attachment member to hold the nut fixed against rotation.

As seen in FIG. 3, locking post 56 may be sized to extend all the way through hitch receiver 10 and hitch attachment member 16 so that an end of the locking post is exposed outside of the hitch receiver. At the exposed end, locking post 56 may include a nub 56a adapted to interact with a post locking mechanism 68 to prevent withdrawal of the locking post from the hitch attachment member. Locking mechanism 68 is oversized relative to the holes provided through the hitch receiver and hitch attachment member such that, when secured to nub 56a, the mechanism prevents withdrawal of locking post 56 from its inserted position. Locking mechanism 68 includes a hole for receiving nub 56a and an internal locking mechanism (not shown) that is actuated by key 70 to secure the mechanism to the nub. The locking mechanism may further be provided with an integrated removable cover 68a for covering the keyhole when the key is not being used.

Referring now to FIGS. 2–5, the integrated-torque-applying tool and its interaction with the other components will be more particularly described. As previously indicated, the torque-applying tool may include a wrench 50. The wrench has a closed head 50a (best seen in FIG. 5) and an elongate handle or lever portion 50b extending away from the head. The head of the wrench is configured to positively grip bolt head 34 to create a torque-transferring connection between the wrench and locking post 56. Handle 50b extends away from the wrench head in a direction perpendicular to axis 60, i.e. perpendicular to the axis about which locking post 56 is rotated to tighten or loosen the system.

Figure 4:
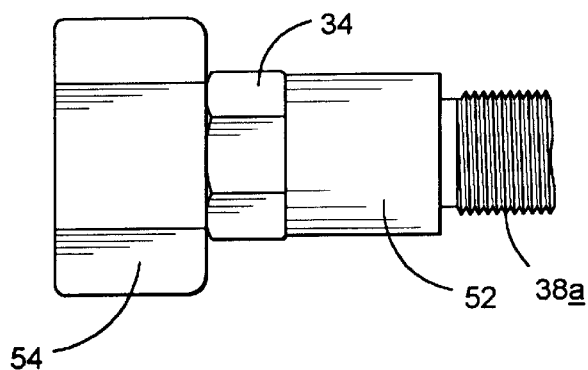
FIG. 4 is a partial view of an embodiment of a fastening mechanism similar to that depicted in FIG. 2, but having an alternately configured locking post.

As previously indicated, the torque-applying tool is selectively configurable in an engaged configuration and disengaged configuration. In the engaged configuration, the torque-applying tool and locking post rotate together; in the disengaged configuration, they rotate independently of one another. For example, as seen in FIGS. 2 and 3, locking post 56 may include a tool-engage region 72 and a tool-disengage region 74, where the fastening mechanism is configured so that wrench 50 may be moved between the two regions. Tool-engage region 72 includes bolt head 34, and tool-disengage region 74 includes cylindrical portion 52, which is provided between bolt head 34 and knob 54 so that the bolt head is between the cylindrical portion and threaded portion 38a. Alternatively, as seen in FIG. 4, the tool-engage and tool-disengage regions may be reversed, with cylindrical portion 52 being between bolt head 34 and threaded portion 38a. In either configuration, cylindrical portion 52 is typically positioned immediately adjacent bolt head 34 so that the bolt head and cylindrical portion are generally co-axial, and is sized to have a cross-section that roughly corresponds in size to the cross section of the bolt head. This allows wrench 50 to be easily moved between the two structures.

As indicated in FIG. 3, wrench 50 may be moved along the length of locking post 56 between the tool-engage and tool-disengage regions so that wrench head 50a encircles either cylindrical portion 52 or bolt head 34. When wrench head 50a encircles bolt head 34 so as to engage the bolt head, a torque-transferring connection is established between the wrench and the locking post. Torque may thus be imparted from the wrench to locking post 56 via bolt head 34, and vice versa, such that the wrench and locking post rotate together about axis 60. When wrench 50 is moved so that wrench head 50a encircles cylindrical portion 52, there is no positive grip or torque-transferring connection between the wrench and the locking post. The wrench and locking post thus may rotate about axis 60 independent of one another. When the wrench is retracted from the bolt head and positioned over the cylindrical portion, manual adjustment knob 54 may be used to finger-tighten the fastening mechanism.

Figure 5:
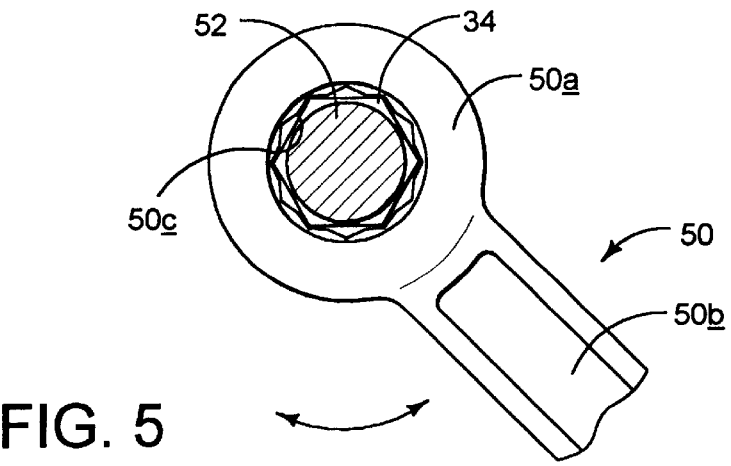
FIG. 5 is a cross-sectional end view taken along line 5—5 of FIG. 2, depicting the locking post and integrated torque-applying tool shown in FIGS. 2 and 3.

FIG. 5 is a cross-sectional end view of locking post 56, showing possible shapes and relative dimensions of cylindrical portion 52, bolt head 34 and wrench head 50a. On its inner edge, wrench head 50a includes a plurality of angular indentations 50c to enable the wrench head to grip the outer surface of the bolt head. As previously indicated, the circumference of the cylindrical portion is typically roughly equal to the perimeter of the bolt head. Regardless of the relative dimensions of the cylindrical portion and bolt head, both are sized to accommodate wrench head 50a. The depicted bolt head is hexagonal, but the bolt head may be square, torx-type or have any other configuration that can interact with a torque-applying tool to create a torque transferring connection.

Figure 6:
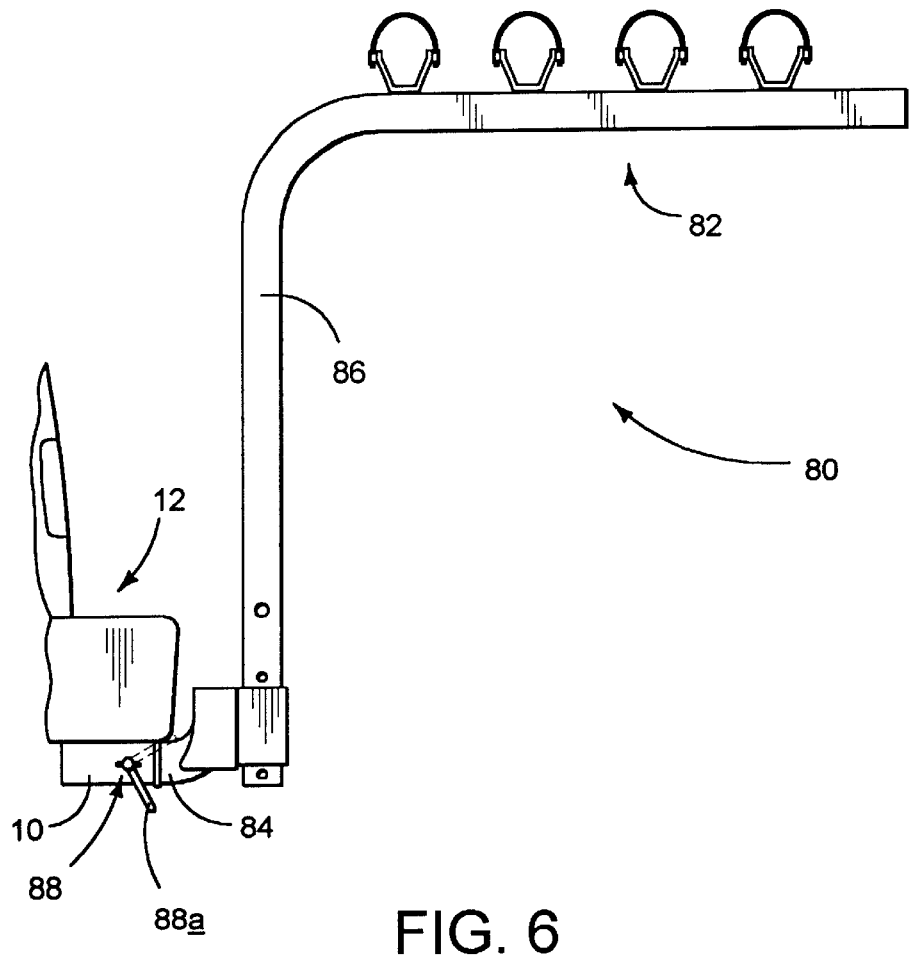
FIG. 6 is a side view of an embodiment of a vehicle load carrier constructed according to the present invention.

The provision of a torque-transferring connection between the fastener and torque-applying tool that may be easily established and disconnected greatly facilitates tightening and loosening of the invented fastening mechanism. In particular, the depicted wrench may first be engaged with bolt head 34 and rotated through a limited angle about axis 60 to either tighten or loosen the fastening mechanism. The wrench may then be retracted from the bolt head and positioned over the cylindrical portion, repositioned in a desired angular orientation, and then re-engaged with bolt head to further apply torque to rotate bolt head 34 as desired. The range of rotation may be limited for a number of reasons. For example, the position of the fastening mechanism may make it easier for a user to operate the wrench through a particular range of motion. Another reason is that various other structures, such as the rear bumper of an automobile, may obstruct rotation of the wrench about axis 60, as seen in FIG. 6. In addition to these advantages, since the torque-transferring connection between the fastener and tool may be disengaged, the torque-applying tool may be stored in a desired orientation independent of the particular rotational position of the bolt. For example, it may be desirable that the wrench be oriented parallel to the walls of the hitch receiver, and thus parallel to the ground, during transit.

A biasing member may be provided to bias the torque-applying tool into either the engaged configuration or disengaged configuration. As seen in FIGS. 2 and 3, the biasing member may take the form of a coiled spring 64 sized so that it coils around locking post 56. A first end of the spring bears against manual adjustment knob 54, while an opposite end of the spring bears against wrench head 50a to urge the wrench toward tool engagement region 74, and thus onto bolt head 34. Accordingly, when wrench head is positioned so as to encircle and engage bolt head 34, spring 64 maintains the wrench engaged with the bolt head unless an external retracting force is applied that is sufficiently large to overcome the spring force. A spring may similarly be employed with the embodiment depicted in FIG. 4 to urge an integrated torque-applying tool toward or away from bolt head 34. Alternatively, the biasing member may include a leaf spring member, elastomeric material, or other means for biasing the torque-applying tool into either the engaged or disengaged configurations. Typically, the biasing member biases the tool into the engaged configuration, however the system may easily be modified so that the tool is biased into the disengaged configuration. One advantage of biasing the tool into the engaged position is that it will not swing or rotate during storage and transit.

The torque-applying tool is integrated with the invented fastening mechanism, in that it is semi-permanently attached to the fastening mechanism so that it cannot be removed without disassembling the fastening mechanism. For example, as seen in FIGS. 2, 3 and 5, closed wrench head 50a encircles locking post 56, and is sized so that it cannot be moved along axis 60 past manual adjustment knob 54. Lock washer 62 and threaded region 38a are configured so that the lock washer cannot be passed over the threaded region in a direction away from the manual adjustment knob. The lock washer is further sized to prevent the wrench head from passing over the lock washer in a direction away from the manual adjustment knob. The wrench head is thus maintained on locking post 56 between the manual adjustment knob and the lock washer.

It should be appreciated that the invented clamping/fastening mechanism may be embodied in numerous forms other than those described with reference to the depicted embodiments. For example, the clamping mechanism may include an integrated ratchet-type mechanism for rotating a clamp member to selectively secure and release the structures held by the clamping mechanism. Another alternative would be to provide a knob having a hexagonal recess configured to grip bolt head 34, with the knob being semi-permanently attached to the bolt head and selectively displaceable in and out of a configuration in which the bolt head is received in the recess.

The described fastening mechanism may be advantageously employed in a vehicle load carrier for carrying luggage, recreational equipment, or virtually any other type of load. FIG. 6 depicts a vehicle load carrier including a recreational equipment rack 80 adapted for exterior engagement on a vehicle. Recreational equipment rack 80 includes a hitch attachment member 84 configured to be inserted into and secured within hitch receiver 10 provided on rear bumper region 12 of a vehicle. Rack 80 includes a carrier portion 82 configured to support and carry bicycles, however the carrier portion may be configured to carry virtually any type of load, including luggage, cargo carriers and other types of recreational equipment. Load carrier 80 may include a support or other structure, such as mast 86, connected between carrier portion 82 and hitch attachment member 84. A fastening mechanism 88, similar to the mechanism described with reference to FIGS. 2–5, is provided to secure hitch attachment member within hitch receiver 10. The fastening mechanism may include an integrated torque-applying tool 88a, as previously described, to selectively tighten and loosen the fastening mechanism.

Those skilled in the art will appreciate that the present invention provides a number of advantages over known vehicle load carriers, and over the fastening mechanisms used with those carriers. First, the disclosed fastening mechanism tightly secures a hitch attachment member within a hitch receiver, thus reducing or eliminating play and other relative movement between the hitch attachment member and hitch receiver. This avoids unnecessary wear on the hitch attachment member and hitch receiver, and on the various components used to secure them together. By eliminating or reducing play, the disclosed embodiment also minimizes rattling, squeaking and other potentially bothersome noises. In addition, the disclosed fastening mechanism reduces the risk that relative movements between component parts of the load carrier, or between the carrier and the load, will distract the occupants of the vehicle or cause the rack or supported load to become unsecured from the vehicle.

These advantages are realized in the present embodiment through a unique, easy-to-operate fastening mechanism. The system allows a user to easily tighten or loosen the fastening mechanism with an integrated tool that cannot be lost, forgotten or left behind. No separate torque-applying tool is required. The torque-transferring connection between the integrated tool and the other system components is easily established and disengaged to permit easy tightening and loosening of the system, even where torque can only be applied through a limited rotational range.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A vehicle load carrier configured to carry recreational equipment on the exterior of a vehicle, comprising:
   a recreational equipment rack adapted for exterior engagement on a vehicle;
   a torque-operated clamping mechanism, including
      a rotatable clamp member, where the torque-operated clamping mechanism is adapted to selectively secure and release an article to the rack upon rotation of the clamp member; and
      a torque-applying member selectively configurable in an engaged configuration in which the torque-applying member and clamp member rotate together, and in a disengaged configuration in which the torque-applying member and clamp member rotate independently of one another, where the torque-applying member is semi-permanently attached to the clamping mechanism so that it cannot be removed without disassembling the clamping mechanism.

2. The vehicle load carrier of claim 1, where the article is a piece of recreational equipment.

3. The vehicle load carrier of claim 1, where the article is another component of the vehicle load carrier.

4. The vehicle load carrier of claim 1, further comprising a biasing member configured to bias the torque-applying member into one of the engaged configuration and the disengaged configuration.

5. The vehicle load carrier of claim 4, where the biasing member includes a spring configured to urge the torque-applying spring into the engaged configuration.

6. The vehicle load carrier of claim 1, where the torque-applying member includes a wrench.

7. The vehicle load carrier of claim 6, where the wrench includes a closed head that encircles and engages a bolt head provided on the rotatable clamp member when the torque-applying member is configured in the engaged configurafion, and where the closed head encircles a cylindrical portion provided on the clamp member adjacent the bolt head when the torque-applying member is configured in the disengaged configuration.

8. The vehicle load carrier of claim 1, where the torque-applying member includes an elongate handle.

9. The vehicle load carrier of claim 1, where the recreational equipment rack is adapted to carry a bicycle.

10. A vehicle load carrier configured to carry recreational equipment on the exterior of a vehicle, comprising:
   a recreational equipment rack adapted for exterior engagement on a vehicle, including a hitch attachment member configured to be secured within a hitch receiver;
   a fastening mechanism for securing the hitch attachment member within a hitch receiver, including:
      a fastening member, where the fastening mechanism is adapted to selectively secure and release the hitch attachment member to the hitch receiver upon rotation of the fastening member;
      a torque-applying tool selectively configurable in an engaged configuration in which the torque-applying tool and fastening member rotate together, and in a disengaged configuration in which the torque-applying member and fastening member rotate independently of one another, where the torque-applying member is integrated with the fastening mechanism.

11. The vehicle load carrier of claim 10, further comprising a biasing member configured to bias the torque-applying tool into one of the engaged configuration and the disengaged configuration.

12. The vehicle load carrier of claim 11, where the biasing member includes a spring configured to urge the torque-applying tool into the engaged configuration.

13. The vehicle load carrier of claim 10, where the torque-applying tool includes an elongate handle.

14. A vehicle load carrier configured to carry recreational equipment on the exterior of a vehicle, comprising:
   a recreational equipment rack adapted for exterior engagement on a vehicle, including a hitch attachment member configured to be inserted into a hitch receiver so that transverse holes provided in the hitch attachment member and hitch receiver are aligned;
   a bolt structure including a head portion that is oversized relative to the transverse holes and a post extending from the head portion, where the post includes threads and is configured to be inserted at least partially through the transverse holes of the hitch attachment member and hitch receiver to be received by a corresponding threaded portion, and where the hitch attachment member and hitch receiver are selectively clamped together and released upon rotation of the bolt structure.

15. The vehicle load carrier of claim 14, further comprising a torque-applying tool selectively configurable in an engaged configuration in which the torque-applying tool and bolt structure rotate together, and in a disengaged configuration in which the torque-applying tool and bolt structure rotate independently of one another, where the torque-applying tool is semi-permanently attached to the bolt structure.

16. The vehicle load carrier of claim 15, further comprising a biasing member configured to bias the torque-applying tool into the engaged configuration.

17. The vehicle load carrier of claim 15, where the torque-applying tool includes an elongate handle.

18. The vehicle load carrier of claim 15, where the torque-applying tool includes a wrench.

19. The vehicle load carrier of claim 15, where the wrench includes a closed head that encircles and engages a bolt head provided on the head portion of the bolt structure when the torque-applying member is configured in the engaged configuration, and where the closed head encircles a cylindrical portion provided adjacent the bolt head when the torque-applying member is configured in the disengaged configuration.

20. The vehicle load carrier of claim 14, where the bolt structure includes a tool-engage region and a tool-disengage region, the vehicle load carrier further comprising a torque-applying tool integrated with the bolt structure and movable between the tool-engage region and the tool-disengage region to selectively apply torque to the bolt structure, where the bolt structure is adapted so that the torque-applying tool can only apply torque to the bolt structure when moved to the tool-engage region.

21. The vehicle load carrier of claim 20, where the tool-engage region includes a bolt head and where the tool-disengage region includes a cylindrical portion adjacent the bolt head.

22. The vehicle load carrier of claim 21, where the bolt head is between the cylindrical portion and the threads provided on the post.

23. The vehicle load carrier of claim 21, where the cylindrical portion is between the bolt head and the threads provided on the post.

24. The vehicle load carrier of claim 21, where the torque-applying tool includes a wrench having a closed head that is movable between an engaged position in which the wrench head encircles and engages the bolt head, and a disengaged position in which the wrench head encircles the cylindrical portion.

25. The vehicle load carrier of claim 20, further comprising a biasing member configured to urge the torque-applying tool toward one of the tool-engage and tool-disengage regions.

26. The vehicle load carrier of claim 25, where the biasing member includes a spring configured to urge the torque-applying tool toward and into engagement with the tool-engage region.

27. The vehicle load carrier of claim 14, where the corresponding threaded portion is included on a nut configured to be positioned within an interior region of the hitch attachment member.

28. The vehicle load carrier of claim 27, further comprising a nut retainer configured to be positioned within the interior region of the hitch attachment member to hold the nut fixed against rotation relative to the hitch attachment member.

29. The vehicle load carrier of claim 28, where the nut retainer includes outwardly-biased arms that contact an interior wall bounding the interior region of the hitch attachment member.

30. The vehicle load carrier of claim 14, where the aligned holes and post are configured to permit the post to be extended all the way through the hitch receiver and hitch attachment member so that an end portion of the post is exposed outside the hitch receiver, further comprising a locking mechanism oversized relative to the transverse holes and configured to be selectively locked to the end portion of the post to prevent withdrawal of the post from the transverse holes.

31. A fastening mechanism for securing a hitch attachment member inserted into a hitch receiver, comprising:

a torque-receiving member, where the fastening mechanism is configured to selectively hold the hitch attachment member against an internal wall of the hitch receiver and release the hitch attachment member from the internal wall upon rotation of the torque-receiving member; and a torque-applying tool selectively configurable in an engaged configuration in which a torque-transferring connection exists between the torque-applying tool and the torque-receiving member, and in a disengaged configuration in which the tool cannot apply torque to the torque-receiving member, where the torque-applying tool is semi-permanently attached to the torque-receiving member.

32. The fastening mechanism of claim 31, further comprising a biasing member configured to bias the torque-applying tool into the engaged configuration.

* * * * *